United States Patent [19]

White

[11] 4,157,643
[45] Jun. 12, 1979

[54] BALER LOADING APPARATUS

[75] Inventor: Allen A. White, Peabody, Kans.

[73] Assignee: Hesston Corporation, Hesston, Kans.

[21] Appl. No.: 778,248

[22] Filed: Mar. 16, 1977

Related U.S. Application Data

[62] Division of Ser. No. 675,529, Apr. 9, 1976, Pat. No. 4,132,163.

[51] Int. Cl.² .............................................. A01D 39/00
[52] U.S. Cl. ........................................ 56/341; 100/50; 100/142; 100/189
[58] Field of Search ................. 100/188, 50, 189, 249, 100/232, 174, 142; 51/364, 343, 341, 344

[56] References Cited

U.S. PATENT DOCUMENTS

| Re. 2,192 | 3/1866 | Craven et al. | 56/364 |
|---|---|---|---|
| 2,552,888 | 5/1951 | Druetta | 100/189 |
| 2,592,932 | 4/1952 | McClellan et al. | 100/189 X |
| 2,608,929 | 9/1952 | Paradise et al. | 100/189 |
| 2,917,993 | 12/1959 | Nikkel | 100/189 X |
| 3,479,950 | 11/1969 | Freeman | 100/189 X |

*Primary Examiner*—Peter Feldman
*Attorney, Agent, or Firm*—Schmidt, Johnson, Hovey & Williams

[57] ABSTRACT

If the next charge to be stuffed into the baling chamber has not yet reached the desired size and density by the time the stuffing fork and compacting plunger are ready to begin their next operating cycles, the plunger and the fork are temporarily deactivated until the charge reaches full size and density. Thereupon, the fork stuffs the entire charge into the baling chamber in a single cycle of operation for compaction by the plunger. The baler is loaded from the bottom of the baling chamber through an upwardly curved duct that serves both as an accumulating chamber and as a precompression area into which the charge is progressively packed by a rotating, retractable finger drum at the lower end of the duct. The plunger closes the top of the duct during such accumulation and pre-compression, and in order to provide ample time for the plunger to retract from the duct when the stuffing cycle commences, the fork moves slowly at first but then quite rapidly once the plunger has retracted. Actuation of the plunger and stuffing fork occurs automatically in response to obtaining the predetermined density of the accumulated charge as sensed by a pressure-sensitive device on the loading duct.

9 Claims, 9 Drawing Figures

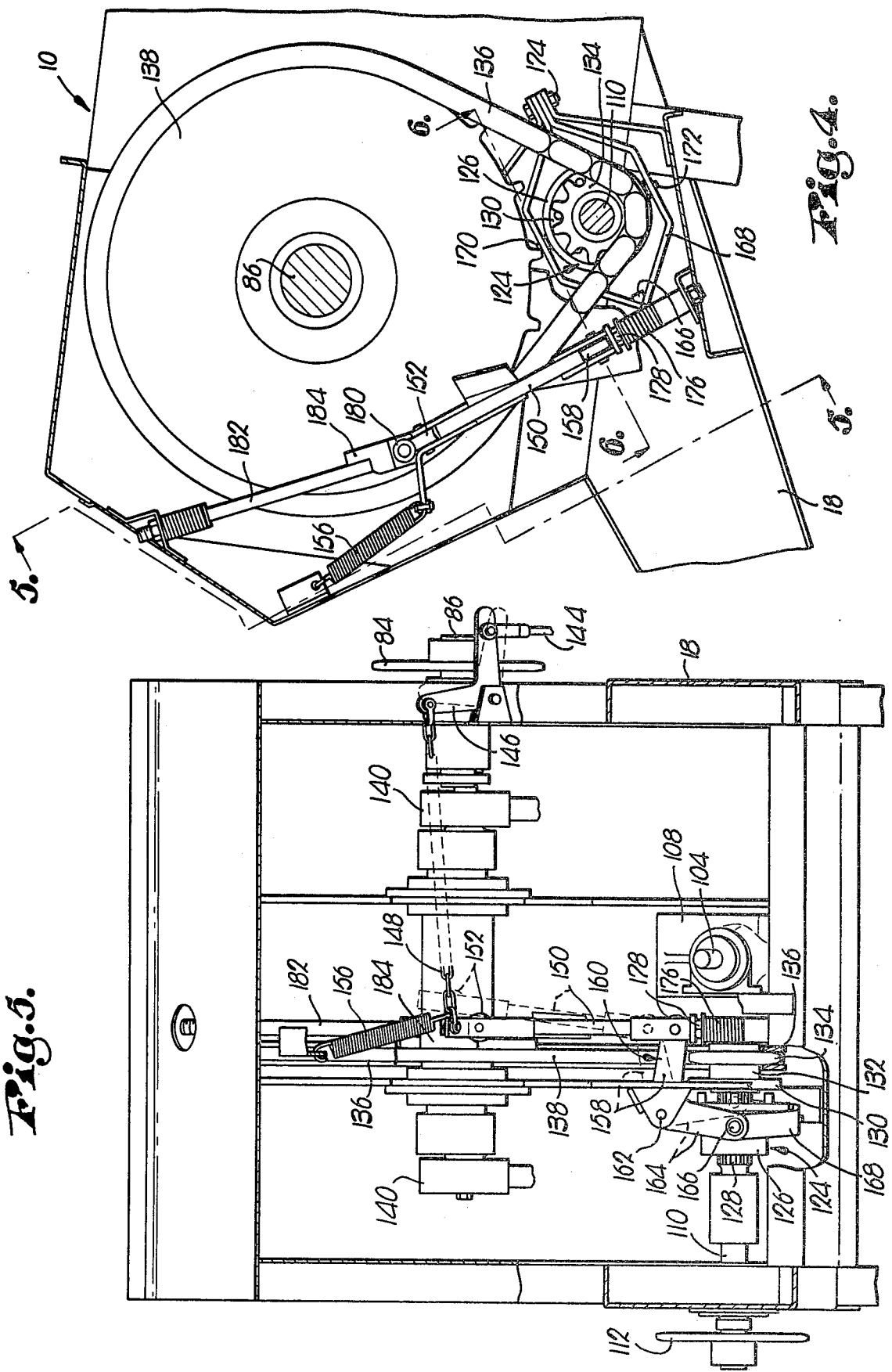

BALER LOADING APPARATUS

This is a division of application Ser. No. 675,529 filed on Apr. 9, 1976, now U.S. Pat. No. 4,132,163.

This invention relates to balers and, more particularly, to crop pickup balers and the manner in which crop material is loaded into the baling chambers of such machines.

While the compaction segment of a baling process is, of course, an important aspect in preparing a bale having a desired density and configuration, the loading stage of the process is perhaps even more critical to the formation of a bale having the most desirable qualities. Because crop conditions are ever changing, and because the operator seldom has a perfectly shaped windrow to work from, e.g., the windrow may vary in width, height and may skip periodically, the plunger normally receives charges of material that can vary substantially in size and density from one time to the next. Consequently, the finished bale may have pockets of low density scattered throughout its body as well as high density areas along one side thereof, all of which can make the bale difficult to tie, hard to handle, and virtually impossible to stack.

The foregoing problems are aggravated considerably where the baler is designed to produce massive rectangular bales on the order of one ton or more as compared to the conventional 60 to 90-pound bales typically produced by contemporary equipment. Inasmuch as conventional mowing and conditioning equipment is designed to produce windrows which are suited for conventional balers having small capacity baling chambers, their small windrows are simply overmatched by the massive baling chamber of a machine which is capable of making a one-ton bale. The baling chamber becomes starved for material and, as a result, a bale having the desired density and configuration simply cannot be produced using solely small baling techniques.

One effort to resolve the problem is illustrated in U.S. Pat. No. 3,552,109, issued to P. A. M. Murray, et al, on Jan. 5, 1971. The large baler in that patent utilizes the concept of loading a series of small wads into the baling chamber across the face of the plunger instead of attempting to insert a single large charge that would occupy the entire cross-sectional area of the chamber between the plunger and the preceding material. As a consequence, however, the finished bale is of relatively low density and lacks the cohesiveness and integrity that are desirable in a dense, high-quality crop bale.

Accordingly, as a more desirable and workable solution to the problem, it is one important object of the present invention to provide a way of insuring that the baling chamber receives a material charge of precisely the same size and density time after time, regardless of varying crop conditions and windrow characteristics, to the end that a high density, uniformly dense, properly shaped bale can be produced.

In achieving the foregoing object an important feature of this invention is the provision of collecting continuously picked up material in an accumulating chamber before stuffing the material into the bale chamber. If the accumulated material has not reached a predetermined size and density by the time the stuffer is ready to begin its next cycle, the stuffer is temporarily deactivated until the shortage is made up.

Further important features of the present invention include loading the baling chamber from the bottom of the latter such as to assure that the charge is distributed across the entire face of the plunger, packing the charge into the accumulation chamber through a rotary, retracting finger drum so as to provide continuous packing action and uniform density throughout the charge, and automatically initiating the stuffing and compacting cycle by sensing the density of the accumulating charge with a pressure-sensitive device.

Another important object of the present invention is to obtain rapid stuffing of the charge into the baling chamber once the stuffer has been actuated so as to provide increased time for the plunger to complete its single extension and retraction stroke during each loading-compression cycle.

In achieving the preceding object, an important feature of the present invention lies in varying the fulcrum point of the lever-like stuffing fork during movement in its kidney-shaped path of travel such that a short lever arm is presented at the operated end of the fork during the stuffing stroke to gain speed at the opposite crop-engaging end of the fork, the conditions being reversed during return of the fork to its standby position.

An additional important object of this invention is to provide, in a bottom loading baler, uniform bale density top-to-bottom, regardless of the natural tendency for the material to settle toward the bottom of the bale by gravity. In this regard, an important feature of the invention involves flaring the loading duct outwardly adjacent the top of the latter with respect to the bottom thereof so that the charge contained within the loading duct has a greater volume of material at the top than the bottom, thereby accommodating the inherent settling action of the material to ultimately arrive at a uniform density across the entire cross-sectional face of the bale.

In the drawings:

FIG. 4 is an enlarged, fragmentary, elevational view of the left front side of the baler with housing structure removed to reveal details of the clutch and its associated drive mechanism;

FIG. 5 is a fragmentary, cross-sectional view of the clutch and mechanism taken substantially along line 5—5 of FIG. 4;

Figure 7:
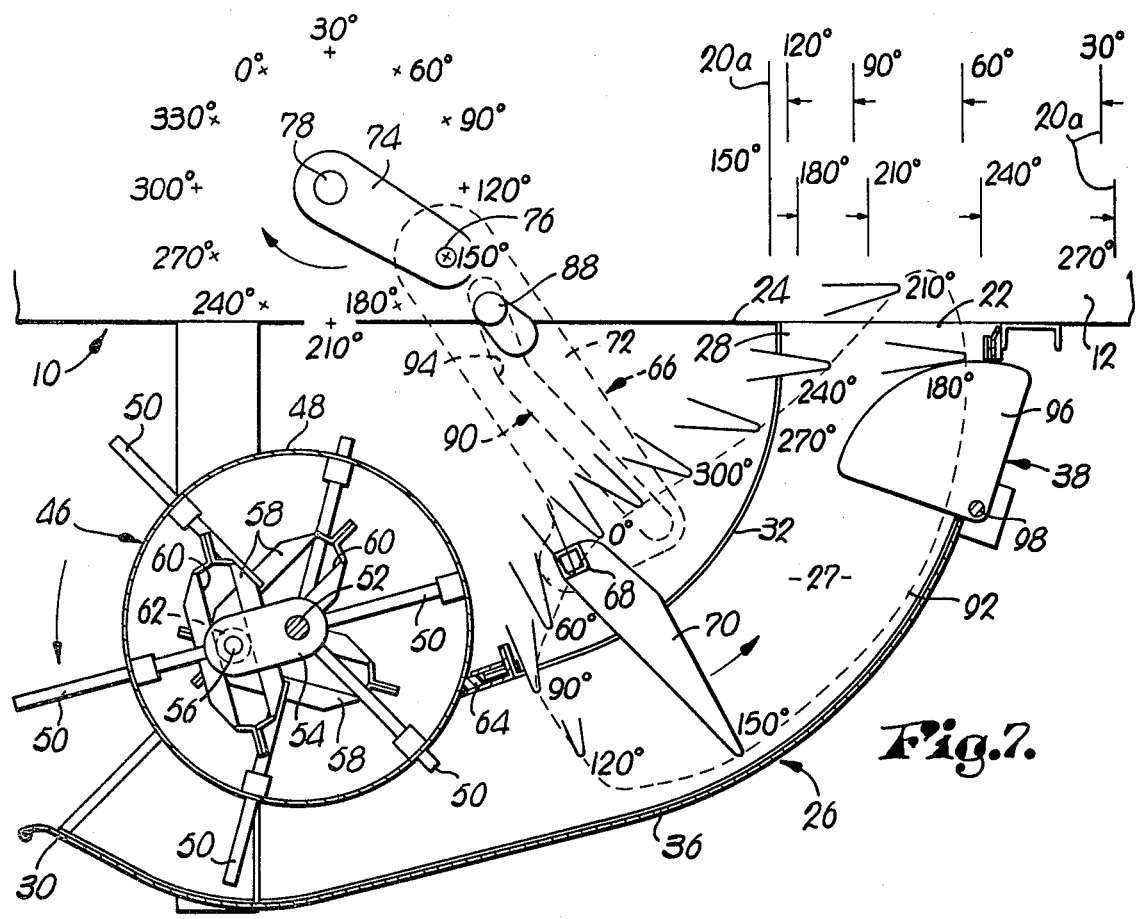
FIG. 7 is a fragmentary, vertical, cross-sectional view through the loading apparatus illustrating the position of the stuffing fork with respect to the plunger at corresponding points in the loading-compacting cycle.
Figure 8:
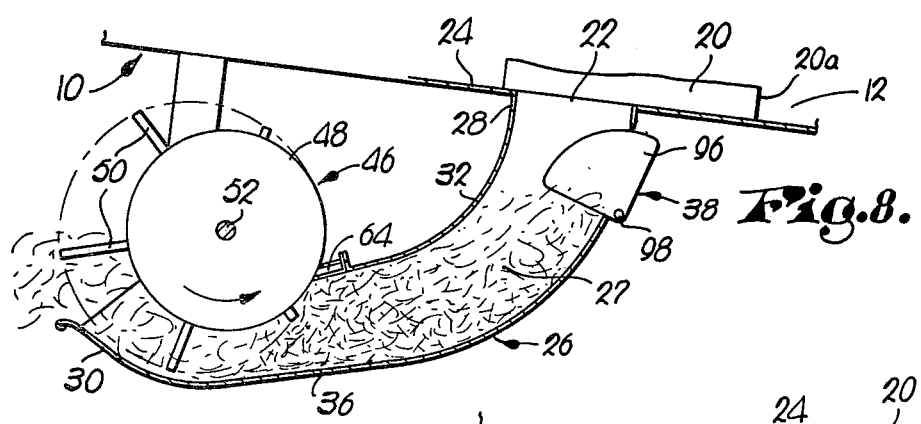
FIG. 8 is a schematic view of the loading duct and packing drum on a reduced scale illustrating the manner in which crop material is accumulated in the duct.
Figure 9:
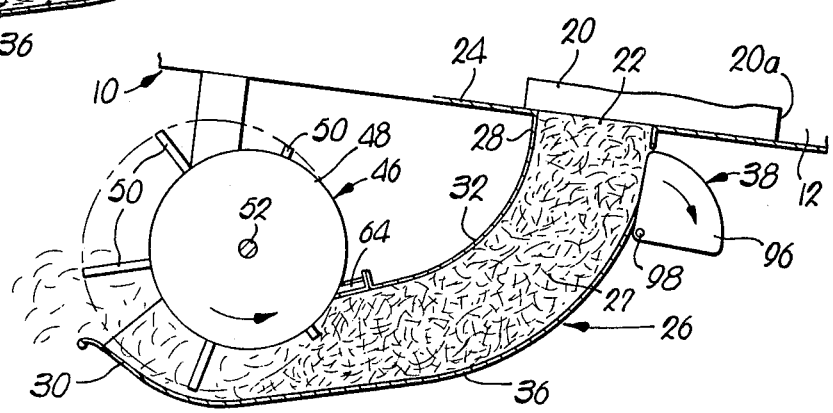
FIG. 9 is a view simiar to FIG. 6, but showing the manner in which the sensing device is operated when a full charge has been packed into the duct.

The baler has a long fore-and-aft extending bale case 10 of rectangular cross section that defines a baling chamber denoted by the numeral 12 in FIGS. 7, 8 and 9. The bale case 10 is supported in a slightly upwardly and forwardly inclined manner by struts 14 having ground-engaging wheels 16 at their lowermost ends, and a downwardly and forwardly projecting tongue 18 at the front of the bale case 10 is adapted for hitching the baler to a towing vehicle (not shown) for advancing the same across a field. An enclosed plunger 20 (FIGS. 8 and 9) reciprocates fore-and-aft within chamber 12 for periodically compacting material presented to the chamber 12 through an inlet 22 in the floor 24 of bale case 10 across the full width thereof.

An upwardly curved loading duct 26 depends from the bale case 10 and has its upper discharge end 28 in registration with the inlet 22, while the lower receiving end 30 of the duct is remote from inlet 22 and is disposed substantially forwardly thereof. Duct 26 flares outwardly in a fore-and-aft direction as its upper end 28 is approached and defines a slightly wedge-shaped chamber 27. The curved top wall 32 of the duct 26 is provided with laterally spaced, longitudinal slots 34 extending the full length thereof, while the curved bottom wall 36 of the duct 26 is solid over its entire length except for the area immediately adjacent the bale case 10 which is longitudinally slotted to accommodate a sensing device 38 yet to be described.

The lower end 30 of the duct 26 is positioned directly behind a crop pickup 40 which may be of any design capable of picking up windrowed materials from the field and delivering the same rearwardly into the duct 26. In the illustrated embodiment, the pickup 40 has a series of lifting tines 42 that sweep the crop upwardly to an overhead auger 44 which gathers the crop centrally and delivers it rearwardly into the end 30 of the duct 26.

A rotary packer 46 is located between the pickup 40 and the duct 26 and across end 30 of the latter for making a pre-compressed charge of material within the duct 26 preparatory to loading the baling chamber 12. As shown perhaps most clearly in FIGS. 3, 7, 8 and 9, the top wall 32 of duct 26 terminates in rearwardly spaced relationship to the forward termination of the bottom wall 36, and the fore-and-aft space defined between such forward terminations is occupied by the packer 46. The latter includes a hollow drum 48 that is supported for rotation above the bottom wall 36 in the area of its upward curvature adjacent end 30, but the vertical distance between the bottom wall 36 and the periphery of the drum 48 at the location is substantially less than the corresponding dimension of the duct 26 throughout the remainder of its length to the bale case 10. Accordingly, the collecting chamber 27 of the duct 26 is constricted in the area immediately below the packer 46 which enables the rear periphery of the drum 48 to function as a backstop to prevent retrograde movement of the material being packed into chamber 27 as will subsequently become clear.

Figure 3:
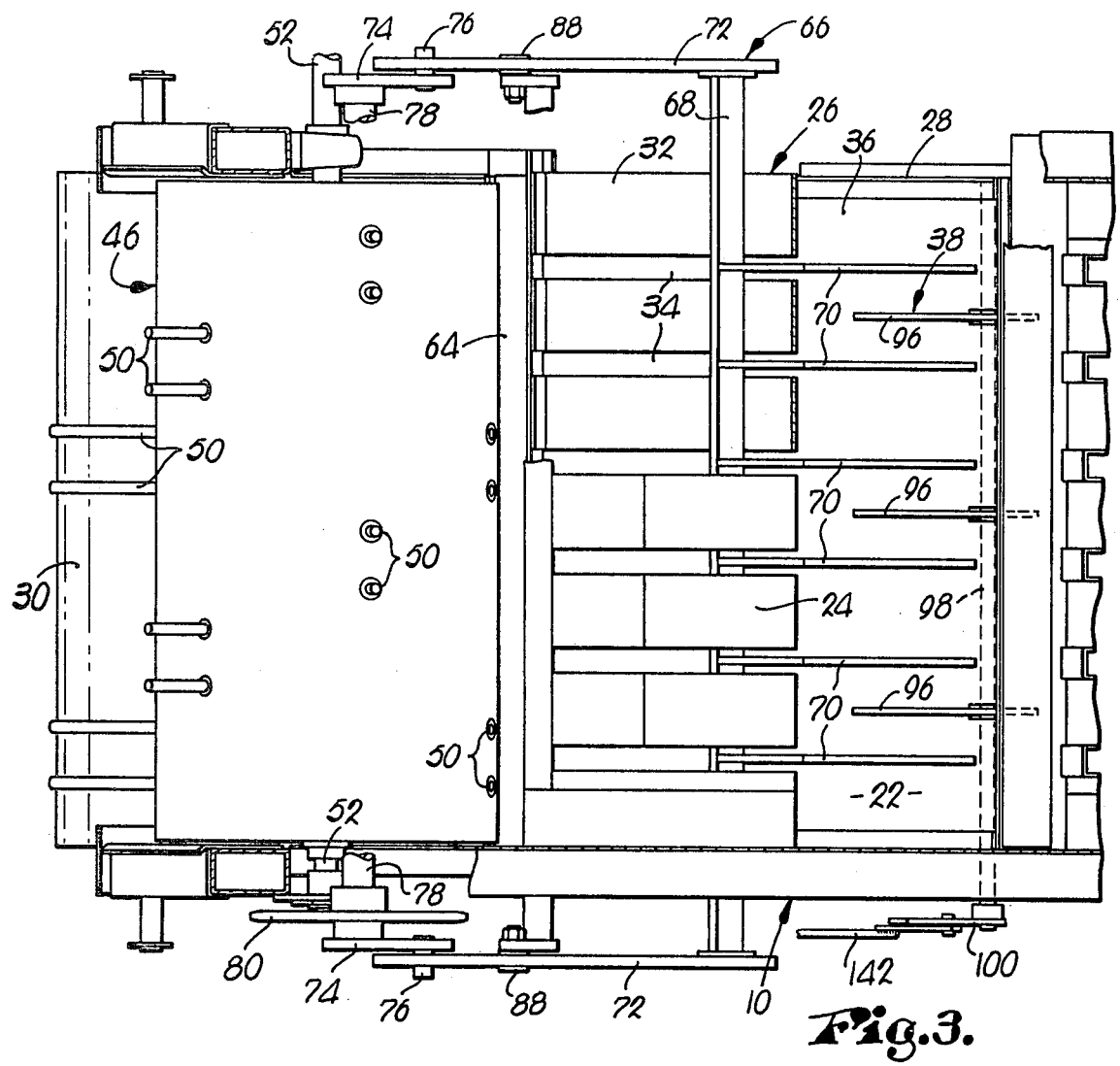
FIG. 3 is a slightly enlarged, fragmentary, essentially horizontal cross-sectional view through the loading apparatus of the baler taken just below the baling chamber.
Figure 6:
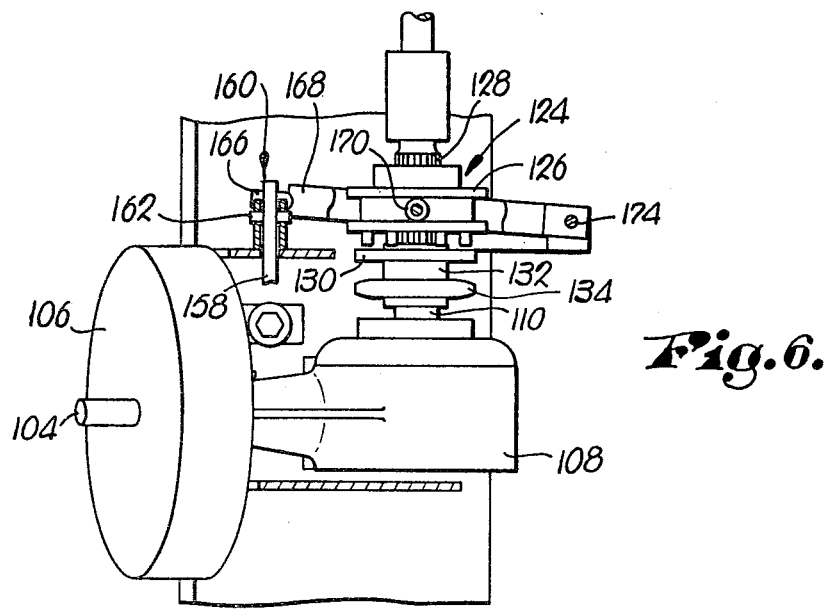
FIG. 6 is a fragmentary, cross-sectional view thereof taken substantially along line 6—6 of FIG. 4.

The packer 46 also includes a plurality of crop-engaging fingers 50 which project radially from the axis of rotation of drum 48 and are disposed about the latter in relatively closely spaced pairs as illustrated in FIG. 3. To carry out the desired packing action and yet effectively withdraw from the crop materials, the fingers 50 are mounted within the drum 48 in such a way as to be extended as the drum 48 rotates down into the crop and retracted as the drum rotates up and out of the crop past the top wall 32 of duct 26. This action per se is not new and may be accomplished using mechanism such as described in U.S. Pat. No. 2,748,921, owned by the assignee of the present invention. Briefly, for purposes of a full understanding of the present invention, suffice it to say that the mechanism for extending and retracting the fingers 50 includes a stationary shaft 52 extending the length of drum 48 in coaxial relationship therewith. A pair of stationary cranks 54 (one only being shown) at opposite ends of the shaft 52 are rigidly affixed to the latter and cooperate to support a second shaft 56 in radially spaced, parallel relationship with the shaft 52. Spaced along the shaft 56 are a number of elongated mounts 58, each of which has a longitudinal trackway 60 within which a roller 62 on shaft 56 can operate, and each of the mounts 58 carries two oppositely extending pairs of the fingers 50. Thus, when the drum 48 is rotated, the fingers 50 and mounts 58 are carried around the axis of shaft 56 which, by its eccentric relationship to the axis of rotation of the drum 48, causes the mounts 58 to move back and forth on rollers 62 and thereby retract and extend the fingers 50, respectively.

An elongated scraper blade 64, mounted on the top wall 32, extends across the full width of the duct 26 in close proximity to the periphery of drum 48 for wiping crop material which might otherwise cling to the drum 48 during its rotation past the top wall 32. Note that inasmuch as fingers 50 are fully retracted as they sweep past top wall 32, they do not interfere with the blade 64 such that a truly effective crop-stripping action is obtained at that point.

Behind the packer 46 and above the loading duct 26 is located a stuffing fork 66 for periodically sweeping an accumulated charge into the baling chamber 12 from the duct 26. The fork 66 has a transverse square tube 68 spanning the duct 26 above the latter from which a series of laterally spaced-apart, elongated tines 70 depend. The tines 70 are spaced apart in accordance with the slots 34 in the top wall 32 of duct 26 such that tines 70 may enter chamber 27 through slots 34 and move along the duct 26 toward the bale case 10 during the loading cycle.

The fork 66 also includes a pair of levers 72 at opposite ends of the tube 68 that are mirror images of one another. Each lever 72 carries the tines 70 at its lower end and is rotatably coupled with a crank 74 at its upper end through a pivot 76. The cranks 74, in turn, are rigidly affixed to opposite ends of a drive shaft 78 that spans the bale case 10 above the packer 46. Shaft 78 is, in turn, driven by a large sprocket 80 (FIG. 2) on the left side of the bale case 10 as viewed from the rear thereof, and the sprocket 80 receives driving power from an endless chain 82 entrained around a drive sprocket 84 carried by a drive shaft 86. In this manner, the normally upper or operated end of each lever 72 is mounted for movement in a circular path of travel about the axis of shaft 78.

A pair of stationary fulcrums 88 for the levers 72 extend laterally outwardly from opposite sides of the bale case 10 and are received within corresponding longitudinally extending slots 90 of the levers 72. Thus, during rotation of the upper ends of levers 72 by cracks 74, the fork 66 is operated through a generally kidney-shaped path of travel 92 into, along and out of the duct 26, as illustrated in FIG. 7. Note that the path of travel 92 extends upwardly through inlet 22 and into the baling chamber 12 for a short distance such as to assure that the charge from duct 26 is fully loaded into the chamber 12 during each loading cycle. Note also that because the levers 72 are shifted along as well as turned about the fulcrums 88 during each revolution of the cranks 74 (compare FIGS. 1 and 2 with FIG. 7), the fulcrum points for the levers 72 are displaced accordingly. Therefore, a long lever arm is presented between the pivots 76 and fulcrums 88 when the levers 72 are in the standby positions of FIGS. 1 and 2, and a short lever arm is presented between pivots 76 and fulcrums 88 when levers 72 are fully into the duct 26 as illustrated in FIG. 7. Consequently, the upsweep or stuffing stroke of the fork 66 is considerably more rapid than the initial entry and final withdrawal strokes thereof. An obliquely extending leg 94 of each slot 90 adjacent the corresponding pivot 76 has the effect of retarding the upsweep of the fork 66 during its initial entry into the duct 26.

Returning now to the sensing device 38 mounted on the bottom wall 36 of duct 26 adjacent the latter's discharge end 28, such device 38 includes a series of quadrant-shaped plates 96 spaced along a common shaft 98 spanning the duct 26 behind the latter. The shaft 98 is supported by the duct 26 for rotation about its longitudinal axis so as to swing the plates 96 edgewise into and out of the chamber 27 as illustrated best in FIGS. 8 and 9. An operating crank 100 fixed to the left end of shaft 98 as viewed from the rear of the machine, has a tension spring 102 (FIG. 2) connected thereto for the purpose of yieldably biasing the plates 96 into the chamber 27 of the duct 26. The tension of spring 102 may be adjusted by means not shown for varying the force with which plates 96 are urged into their standby positions within the chamber 27.

Movement of the device 38 rearwardly to its operated position outside the duct 26, as illustrated in FIG. 9, may be utilized to signal the operator that it is time to actuate the fork 66 and plunger 20. This could, of course, be accomplished in any number of ways such as by causing a light to flash, a bell to ring, or a buzzer to buzz. On the other hand, such movement on the part of the device 38 may be utilized to automatically actuate the fork 66 and the plunger 20, again through a number of suitable mechanisms. One such mechanism is illustrated in FIGS. 2, 4, 5 and 6.

A power input shaft 104 along the tongue 18 carries a flywheel 106 at the upper end of the tongue 18 immediately adjacent a right angle gearbox 108 coupled with the input shaft 104. A live transverse shaft 110 leads laterally from gearbox 108 toward the right side of the machine, where it carries a drive sprocket 112. Sprocket 112, in turn, and through an endless chain 114, drives a second sprocket 116 fixed to the shaft 52 of packer 46, thereby supplying driving power to the latter. A third sprocket 118, also fixed to the shaft 52, in turn drives the mainshaft 120 of the pickup 40 through an endless chain 122. Thus, so long as the power input shaft 104 is rotating, the pickup 40 and the packer 46 are in constant operation.

On the other hand, the plunger 20 and the stuffer 66 are to be operated only if and when the sensing device 38 indicates that the duct 26 has received a charge having the predetermined size and density. Accordingly, the plunger 20 and the stuffer 66 share a common clutch 124, which couples the plunger 20 and stuffer 66 with the live shaft 110 when the clutch 124 is engaged, such latter condition arising only in response to the proper size and density being sensed by the device 38. The clutch 124 has a male half 126 that is carried on a longitudinally splined portion 128 of the live shaft 110 for rotation therewith but relative shifting movement therealong toward and away from the female clutch half 130. The female half 130 has as an integral part thereof a sleeve 132 that receives the live shaft 110 and enables the latter to rotate relative to the female half 130, unless the latter is engaged by the male half 126, in which event both halves (126 and 130) rotate as a unit with the live shaft 110.

The sleeve 132 fixedly carries a small sprocket 134 which is entrained by an endless chain 136 that loops upwardly around a very large sprocket 138 which is fixedly carried on the transverse shaft 86 projecting outwardly beyond the left side of the bale case 10 and carrying the sprocket 84 which ultimately drives the fork 66. Eccentrically coupled with the shaft 86 within the forward part of the machine are pitmans 140 on opposite sides of the large sprocket 138 which lead to the plunger 20 and are drivingly connected thereto in a manner not shown but well understood in the art. Thus, when the clutch 124 is engaged, the large sprocket 138 is caused to rotate which, in turn, drives the shaft 86 to operate the plunger 20 and the fork 66.

The moving force required to shift the male clutch half 126 into driving engagement with the female clutch half 130 is supplied by fore-and-aft link rods 142 and 144 along the left side of the machine which connect the operating crank 100 of the device 38 with a bell crank 146 mounted on the side of the machine near the front thereof. The obliquely disposed bell crank 146 is, in turn, connected through a pull chain 148 to the upper end of an elongated, rigid, generally upright connector 150 having a roller 152 adjacent its upper end for bearing against the proximal face of the large sprocket 138 during operation. The connector 150 is biased yieldably upwardly by a tension spring 156 at its upper end, while at its lower end, the connector 150 is pivotally coupled with the generally horizontal leg 158 of another bell crank 160, the latter being pivoted to the frame of the machine at pivot point 162. The other leg 164 of the bell crank 160 has a loose connection 166 with the forward end of apentagonal, generally vertically disposed yoke 168 that is joined to the male clutch half 126 by upper and lower pivots 170 and 172, respectively. The yoke 168, in turn, is pivotally mounted at its rear end by a pivot 174 for transverse swinging movement along the live shaft 110 such as to thereby impart the necessary movement to the male clutch half 126 for engaging and disengaging the latter from the female clutch half 130. A spring loaded bumper 176, having a bolt head 178 as the top engaging surface thereof, is disposed below and in direct registration with the connector 150, being a separate part from the latter, as may be seen by viewing FIG. 5 wherein the bolt head 178 remains stationary while the connector 150 is lifted off of the latter to its dotted line position as the bell crank 146 pulls on chain 148.

When the connector 150 is in its solid line position of FIG. 5, its roller 152 is caught beneath a lateral projection 180 (FIG. 4) on the large sprocket 138 such as to preclude rotation of the latter in a counterclockwise direction viewing FIG. 4. However, when the sensing device 38 pulls the connector 150 upwardly and outwardly to its dotted line position of FIG. 5, the roller 152 is moved sufficiently outwardly that it can ride up and over the projection 180 when the large sprocket 138 begins to rotate counterclockwise as a result of the engagement of the clutch 124. Such outward displacement of the connector 150 is, however, made against the bias in the opposite direction of the tension spring 156. Accordingly, once the large sprocket 138 has rotated counterclockwise sufficiently far that the projection 180 clears the roller 152, the spring 156 urges the connector 150 back toward the face of sprocket 138 so as to place the roller 152 in alignment with the projection 180 as it comes around at the completion of the single revolution of the sprocket 138. The spring 156 does not, however, urge the connector 150 back down toward its original solid line position of FIG. 5, because this would, of course, disengage the clutch 124. On the contrary, the spring 156 urges the connector 150 upwardly (as well as inwardly toward the sprocket 138) such that, even though the sensor device 38 may return to its standby position and, thus, swing the bell crank 146 inwardly, the connector 150 remains fully raised to keep the clutch 124 engaged until the completion of the stuffing and compacting cycle. Only when the projection 180 reengages the top of the roller 152 after 360° rotation of the sprocket 138 is the connector 150 pushed down to its initial position (against bumper 176) to disengage the clutch 124. At this point, a depending spring-loaded dog 182 slips behind a block 184 on the face of the sprocket 138 to prevent retrograde rotation of the latter.

OPERATION

Figure 1:
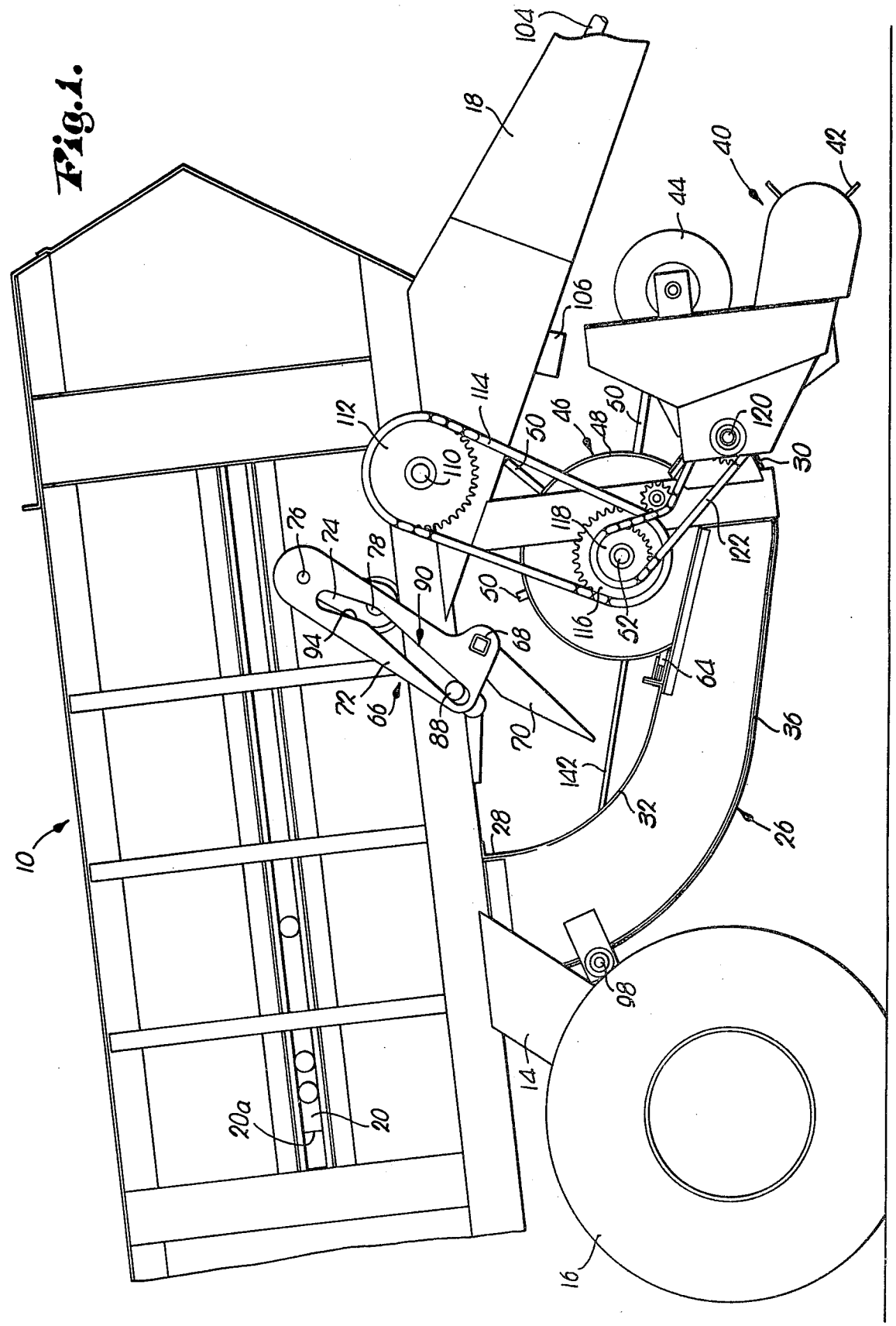
FIG. 1 is a fragmentary, side elevational view of a baler constructed in accordance with the principles of the present invention and capable of carrying out my novel method.
Figure 2:
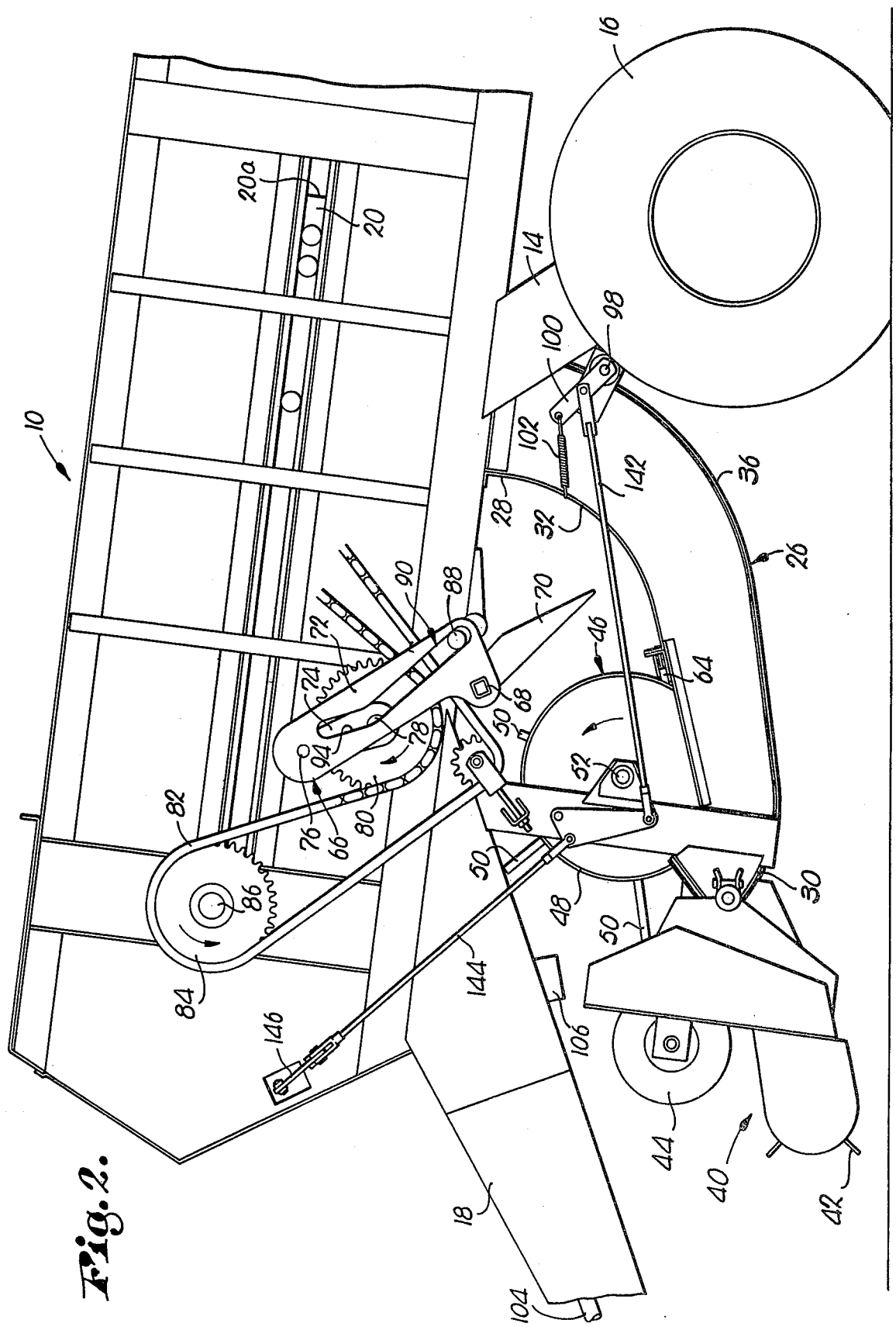
FIG. 2 is a fragmentary, elevational view of the opposite side thereof.

As the baler is advanced, the pickup 40 continuously lifts the material off the ground and delivers it rearwardly to the packer 46 and duct 26, but so long as the sensing device 38 is in its standby position within the chamber 27, the fork 66 and the plunger 20 remain idle. This condition is, of course, illustrated in FIG. 8 wherein the plunger 20 overlies the inlet 22 so as to provide a top closure to the chamber 27 at this time. The fork 66 is, of course, fully out of the duct 26 at this time in its standby position as illustrated in FIGS. 1 and 2. Consequently, as the baler continues to advance and picked up material continues to be packed into the chamber 27 by packer 46, a charge of predetermined size and density begins to accumulate within the duct 26. The material accumulating within chamber 27 cannot escape upwardly through the closed inlet 22, nor can it escape downwardly past the rotating packer 46, and, thus, the density of the accumulation and the force it exerts against the sensor plates 96 is progressively increased until plates 96 are rocked completely out of chamber 27 as depicted in FIG. 9. This engages the clutch 124 in the manner above described to activate plunger 20 and fork 66 through a single operating cycle.

The correlation of movement between the fork 66 and the plunger 20 is illustrated in FIG. 7 wherein it may be seen that during the first 120° of the operating cycle, the front face 20a of the plunger 20 retracts almost to the front edge of the inlet 22, thereby opening the latter, while the fork 66 enters the duct 26 through slots 34 and begins its upsweep toward the baling chamber 12. During the next 60° in the operating cycle (particularly the 30° between 150° and 180°), the fork 66 sweeps rapidly toward the baling chamber 12 to a point slightly below inlet 22 so as to quickly stuff the accumulated charge into the baling chamber 12 between the face 20a of plunger 20 and structure serving as a backstop for the plunger 20, such as a previous charge of material. Note during this interval that the plunger face 20a has extended only slightly from its 150° position.

As the fork 66 and the plunger 20 move from 180° to 240° in their respective cycles, the fork 66 enters baling chamber 12 for a short distance above the inlet 22 in order to assure that the charge is fully stuffed into chamber 12, the plunger face 20a (which is desirably vertically slotted) wipes the charge off the fork 66, and the latter begins its downward withdrawal stroke while the plunger face 20a continues on rearwardly across the inlet 22 to compact the charge rearwardly. During the final 120° of the operating cycle, the fork 66 returns to its standby position and the plunger 20 completes its rearward stroke, placing both components in readiness for the next stuffing and compacting sequence. Of course, the sensing device 38 is returned by spring 102 to its standby position within the accumulating chamber 27 once the fork 66 has stuffed the charge into the baling chamber 12, whereupon the device 38 is ready for the next charge.

Note that the frequency of operation of plunger 20 and fork 66 depends entirely upon how rapidly the material accumulates within duct 26. If at the completion of one cycle the next charge is ready such that sensing device 38 is in its operated position, the clutch 124 will remain engaged and the plunger 20 and fork 66 will operate non-stop. However, if the next charge has not yet reached full size, the plunger 20 and fork 66 will be temporarily deactivated.

After a number of stuffing-compacting cycles have been completed and the bale has reached the desired size, tying mechanism may be activated to bind the compressed bale. No tying mechanism is illustrated or described herein since it has no bearing on the principles of the present invention, but it is to be understood that any one of a number of suitable mechanisms may be selected for use.

At this point, it appears appropriate to reexamine at least certain of the special features of the invention and to elaborate upon their importance. First, it is to be emphasized that the principles of the present invention are not limited to a baler of any particular size, nor to any particular materials. However, it will also be appreciated that they do have particular utility for a baler designed to produce a large rectangular crop bale on the order of one ton or more as contrasted to the 60-pound "man-size" crop bales produced by conventional machines. In this regard, by accumulating a charge within the chamber 27 of duct 26 until such time as that charge obtains a predetermined size and density, the rate at which crop material is fed to the baler by pickup 40 is immaterial. Regardless of whether the windrow is light or heavy, intermittent or continuous, none of the material is introduced into the baling chamber 12 until the charge within chamber 27 reaches exactly the desired characteristics. This means that time-after-time precisely the same type of charge is presented to the plunger 20 for compaction, regardless of the condition of the windrow. The operator is thereby assured of producing a uniformly dense bale which is devoid of deformity-causing material concentrations along one side of the bale. The latter aspect is enhanced by the fact that the duct 26 flares outwardly as its upper end 28 is approached, thereby tending to load an additional amount of material in the top of the baling chamber 12 with respect to the bottom thereof, such additional amount subsequently settling by gravity. Noteworthy also is the fact that such flaring avoids the tendency for crop material to become so packed within the duct 26 that it cannot be extracted therefrom by the fork 66 during the stuffing cycle.

Another feature that demands emphasis is the packer 46 which, while not new per se, is indeed used in a new context insofar as the inventor is aware. The packer 46 is much more than simply a retracting finger feeding device for conveying crop material from the pickup 40 into the duct 26. That function could be achieved by a number of conveyors of suitable design. In contrast, the packer 46, operating in conjunction with the plunger 20 as a closure for the top end 28 of the duct 26, pre-compresses the charge within chamber 27 to a level somewhat less than one-half the density achieved by the plunger 20 in the baling chamber 12. The exact degree of pre-compression, of course, depends upon the length of time the plunger 20 and the fork 66 remain idle, which may be conveniently controlled by the sensing device 38.

Note further that the continuity of packing action provided by the packer 46 is of considerable importance in view of the fact that the charge within chamber 27 would otherwise tend to escape in a retrograde movement out of the lower end 30 of the duct 26. By continuously, rather than intermittently, applying packing force to the charge, the latter is prevented from such retrograde movement.

An additional important feature resides in the relationship between the packing fork 66 and the plunger 20 during the stuffing-compaction cycle. Note that if the plunger 20 is to be used as a closure for the inlet 22, then the plunger 20 must be retracted fully clear of the inlet 22 before the fork 66 begins stuffing the charge up into the baling chamber 12. Once the plunger 20 is retracted, the fork must be operated very rapidly in order to assure that the charge can be completely stuffed, the fork retracted, and the bale compacted within the remaining portion of the operating cycle. Mounting the fork 66 in such a way that its fulcrum point (defined by the location of fulcrums 88 within slots 90) may be displaced between the opposite ends of levers 72 during the stuffing cycle, permits a very short lever arm to be created between the pivots 76 and fulcrums 88 when the fork is inserted into the duct 26 such as to gain speed at the crop engaging tines 70 to accomplish the rapid charging stroke. On the other hand, the withdrawal of the fork at the end of the cycle and its initial movement at the beginning of the next cycle, is relatively slow and steady, allowing time for the plunger 20 to make its necessary movements in readiness for the fork 66.

These features, then, as well as others perhaps not emphasized but inherent in the foregoing disclosure, are conducive to the production of a high density, uniformly dense bale of the highest quality. Such desirable characteristics are obtainable even where a very large bale is produced to enable the rancher to maximize his pay load when a number of such bales are stacked and transported within a limited space over a substantial distance.

Having thus described the invention, what is claimed as new and desired to be secured by letters Patent is:

1. In a crop baler having a baling chamber and a plunger reciprocable within said chamber, the improvement comprising:
   a pickup for lifting crop materials from the ground;
   an elongated tubular duct leading from the pickup to the baling chamber,
   said duct having an inlet adjacent said pickup and an outlet adjacent said baling chamber,
   said plunger being disposed across said outlet during a portion of its reciprocation to thereby close the outlet;
   a packer at said inlet of the duct positioned to feed a continuous stream of crop materials into the duct from the pickup,
   the holding capacity of said duct relative to the feeding capacity of said packer being such that, when said outlet of the duct is closed by the plunger, the packer may compact the materials it feeds to the duct into a precompressed charge of materials that fills the duct from inlet to outlet and assumes the internal configuration thereof; and
   a loader separate from said packer that is operable to stuff the precompressed charge into the baling chamber when the plunger opens said outlet of the duct.

2. In a crop baler as claimed in claim 1, wherein said baling chamber extends generally horizontally, said duct being disposed below said chamber for loading charges into the chamber from the bottom thereof.

3. In a crop baler as claimed in claim 1, wherein said duct is longitudinally slotted, said loader including a fork having a plurality of tines movable in a closed loop of travel into, along, and out of said duct by way of said slots for charging said baling chamber.

4. In a crop baler as claimed in claim 1, wherein said packer includes a rotary unit driven about an axis transverse to the direction of material flow through the duct and having a plurality of crop-engaging fingers associated therewith.

5. Pre-compression apparatus as claimed in claim 1, wherein said packer includes a drum rotatable about an axis transverse to the direction of material flow through the duct, a plurality of fingers carried by the drum for rotation therewith, and means for retracting said fingers into the drum as the fingers sweep out of the pre-compressed charge.

6. Pre-compression apparatus as claimed in claim 5, wherein said duct is provided with a stripper blade positioned in close proximity to the portion of the drum periphery having retracted fingers.

7. Pre-compression apparatus as claimed in claim 6, wherein said drum is disposed to transversely restrict the duct at said inlet.

8. Pre-compression apparatus as claimed in claim 7, wherein said duct is provided with spaced top and bottom walls, said bottom wall being curved under the drum in spaced relation thereto and said top wall intersecting the drum at a point downstream from said inlet with respect to the direction of material flow.

9. Pre-compression apparatus as claimed in claim 8, wherein said stripper plate is mounted on the duct at said point of intersection between the top wall and the drum.

* * * * *

REEXAMINATION CERTIFICATE (848th)
United States Patent [19]
White

[11] B1 4,157,643
[45] Certificate Issued May 3, 1988

[54] BALER LOADING APPARATUS

[75] Inventor: Allen A. White, Peabody, Kans.

[73] Assignee: Hesston Corporation, Hesston, Kans.

Reexamination Request:
No. 90/000,819, Jul. 12, 1985

Reexamination Certificate for:
Patent No.: 4,157,643
Issued: Jun. 12, 1979
Appl. No.: 778,248
Filed: Mar. 16, 1977

Related U.S. Application Data

[62] Division of Ser. No. 675,529, Apr. 9, 1976, Pat. No. 4,132,163.

[51] Int. Cl.⁴ ............................................. A01D 39/00
[52] U.S. Cl. ..................................... 56/341; 100/50; 100/142; 100/189
[58] Field of Search ................................ 198/518

[56] References Cited

U.S. PATENT DOCUMENTS

| | | | |
|---|---|---|---|
| 543,278 | 7/1895 | Washburn | 100/85 |
| 694,166 | 2/1902 | Lee | 100/189 |
| 2,431,828 | 12/1947 | Raney | 56/341 |
| 2,450,082 | 9/1948 | Crumb | 56/344 |
| 2,545,188 | 3/1951 | Baskerville | 100/142 |
| 2,592,932 | 4/1952 | McClellan | |
| 2,748,921 | 6/1956 | White | 198/518 |
| 2,854,809 | 10/1958 | Starrett | 100/189 |
| 2,970,423 | 2/1961 | Wenzel | 56/341 |
| 3,351,002 | 11/1967 | McDuffie | 100/189 |

FOREIGN PATENT DOCUMENTS

| | | |
|---|---|---|
| 1214138 | 4/1966 | Fed. Rep. of Germany . |
| 92339 | 5/1972 | Fed. Rep. of Germany . |
| 1244130 | 8/1971 | United Kingdom ............ 100/85 |

*Primary Examiner*—Harvey C. Hornsby

[57] ABSTRACT

If the next charge to be stuffed into the baling chamber has not yet reached the desired size and density by the time the stuffing fork and compacting plunger are ready to begin their next operating cycles, the plunger and the fork are temporarily deactivated until the charge reaches full size and density. Thereupon, the fork stuffs the entire charge into the baling chamber in a single cycle of operation for compaction by the plunger. The baler is loaded from the bottom of the baling chamber through an upwardly curved duct that serves both as an accumulating chamber and as a precompression area into which the charge is progressively packed by a rotating, retractable finger drum at the lower end of the duct. The plunger closes the top of the duct during such accumulation and pre-compression, and in order to provide ample time for the plunger to retract from the duct when the stuffing cycle commences, the fork moves slowly at first but then quite rapidly once the plunger has retracted. Actuation of the plunger and stuffing fork occurs automatically in response to obtaining the predetermined density of the accumulated charge as sensed by a pressure-sensitive device on the loading duct.

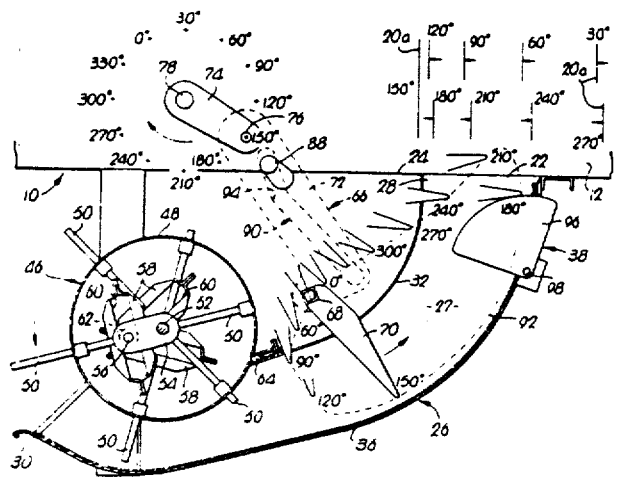

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is cancelled.

Claims 2–6 are determined to be patentable as amended.

Claims 7–9, dependent on an amended claim, are determined to be patentable.

2. [In a crop baler as claimed in claim 1,] *In a crop baler having a baling chamber and a plunger reciprocable within said chamber, the improvement comprising:*
   *a pickup for lifting crop materials from the ground;*
   *an elongated tubular duct leading from the pickup to the baling chamber,*
   *said duct having an inlet adjacent said pickup and an outlet adjacent said baling chamber,*
   *said plunger being disposed across said outlet during a portion of its reciprocation to thereby close the outlet;*
   *a packer at said inlet of the duct positioned to feed a continuous stream of crop materials into the duct from the pickup,*
   *the holding capacity of said duct relative to the feeding capacity of said packer being such that, when said outlet of the duct is closed by the plunger, the packer may compact the materials it feeds to the duct into a precompressed charge of materials that fills the duct from inlet to outlet and assumes the internal configuration thereof; and*
   *a loader separate from said packer that is operable to stuff the precompressed charge into the baling chamber when the plunger opens said outlet of the duct,*
   wherein said baling chamber extends generally horizontally, said duct being disposed below said chamber for loading charges into the chamber from the bottom thereof.

3. In a crop baler as claimed in claim [1] *2*, wherein said duct is longitudinally slotted, said loader including a fork having a plurality of tines movable in a closed loop of travel into, along, and out of said duct by way of said slots for charging said baling chamber.

4. In a crop baler as claimed in claim [1] *2*, wherein said packer includes a rotary unit driven about an axis transverse to the direction of material flow through the duct and having a plurality of crop-engaging fingers associated therewith.

5. Pre-compression apparatus as claimed in claim [1] *2*, wherein said packer includes a drum rotatable about an axis transverse to the direction of material flow through the duct, a plurality of fingers carried by the drum for rotation therewith, and means for retracting said fingers into the drum as the fingers sweep out of the pre-compressed charge.

6. [Pre-compression apparatus as claimed in claim 5,] *In a crop baler having a baling chamber and a plunger reciprocable within said chamber, the improvement comprising:*
   *a pickup for lifting crop materials from the ground;*
   *an elongated tubular duct leading from the pickup to the baling chamber,*
   *said duct having an inlet adjacent said pickup and an outlet adjacent said baling chamber,*
   *said plunger being disposed across said outlet during a portion of its reciprocation to thereby close the outlet;*
   *a packer at said inlet of the duct positioned to feed a continuous stream of crop materials into the duct from the pickup,*
   *the holding capacity of said duct relative to the feeding capacity of said packer being such that, when said outlet of the duct is closed by the plunger, the packer may compact the materials it feeds to the duct into a precompressed charge of materials that fills the duct from inlet to outlet and assumes the internal configuration thereof; and*
   *a loader separate from said packer that is operable to stuff the precompressed charge into the baling chamber when the plunger opens said outlet of the duct,*
   *said packer including a drum rotatable about an axis transverse to the direction of material flow through the duct, a plurality of fingers carried by the drum for rotation therewith, and means for retracting said fingers into the drum as the fingers sweep out of the pre-compressed charge,*
   wherein said duct is provided with a stripper blade positioned in close proximity to the portion of the drum [periphery] *periphery* having retracted fingers.

* * * * *